United States Patent [19]
Bolton

[11] 3,828,593
[45] Aug. 13, 1974

[54] ANTI-THEFT DEVICE FOR VEHICLES

[76] Inventor: Robert Benjamin Bolton, 14, Middle Dr., Ponteland, England

[22] Filed: Mar. 19, 1973

[21] Appl. No.: 342,624

[30] Foreign Application Priority Data
Mar. 24, 1972 Great Britain..................... 14005/72

[52] U.S. Cl....................... 70/209, 70/181, 74/557, 292/150
[51] Int. Cl. ........................................... B60r 25/02
[58] Field of Search ............ 70/494, 515, 544, 557, 70/38, 52, 53, 59; 24/243 K, 247, 263 SW, 263 C, 263 SB, 264; 403/82, 104; 339/253 L, 254 R; 211/4, 7, 8

[56] References Cited
UNITED STATES PATENTS
| | | | |
|---|---|---|---|
| 1,429,334 | 9/1922 | Furber | 70/209 |
| 1,566,473 | 12/1925 | Gibson | 70/38 A |
| 3,462,982 | 8/1969 | Moore | 70/209 |

FOREIGN PATENTS OR APPLICATIONS
| | | | |
|---|---|---|---|
| 1,127,524 | 9/1968 | Great Britain | 70/209 |
| 925,217 | 8/1947 | France | 70/238 |

*Primary Examiner*—Albert G. Craig, Jr.
*Attorney, Agent, or Firm*—Larson, Taylor and Hinds

[57] ABSTRACT

A device for holding the steering wheel of a vehicle against rotation is arranged to grip a sector of the wheel, and has a projecting element which abuts against part of the vehicle if any attempt is made to turn the wheel sufficiently to enable the vehicle to be driven. The device has a channel to receive the steering wheel sector, which is held therein by retaining means which is movable towards and away from the channel, and which can be locked in a retaining position by suitable locking means, but is releasable so that the device may be removed from the wheel and from the vehicle.

6 Claims, 6 Drawing Figures

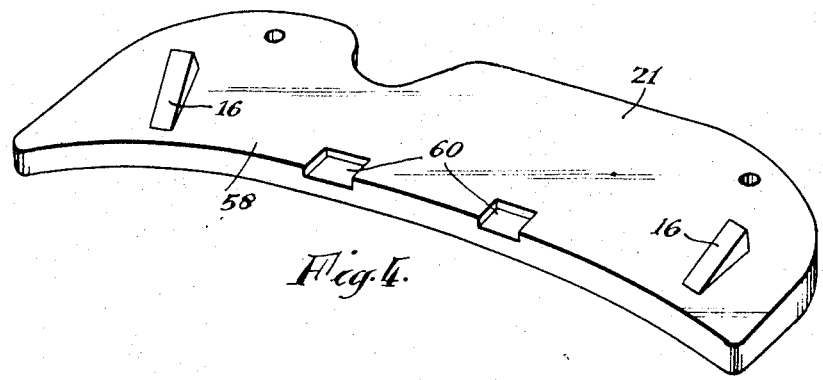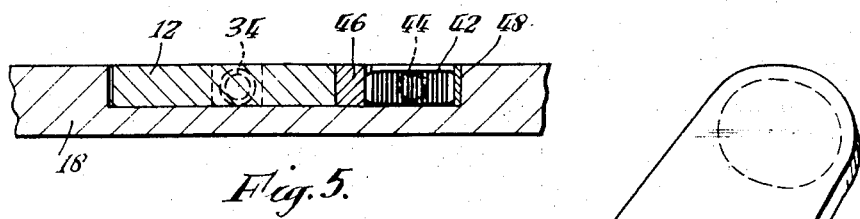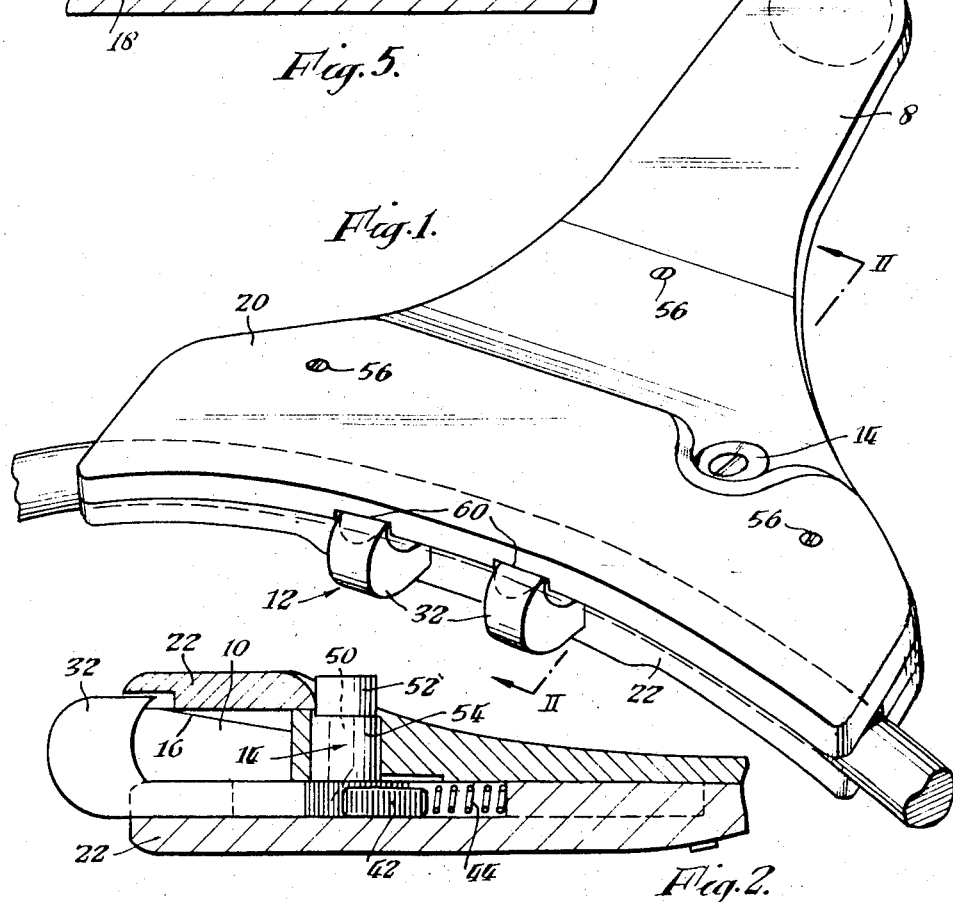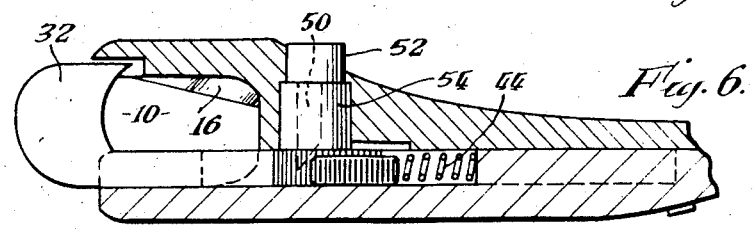

ANTI-THEFT DEVICE FOR VEHICLES

This invention relates to anti-theft devices for cars and other road vehicles of the type which provides an attachment to the steering wheel of a vehicle.

A number of devices of this kind have appeared on the market and others have been proposed. These prior devices may be divided into two main categories. In the first category are the devices which provide a link between the steering wheel and another part of the vehicle so as to prevent any such rotation of the wheel as would be required if the car were to be driven away. The second category includes devices which are fitted to the steering wheel but do not join it to any other part of the car, the device itself projecting beyond the wheel so that the wheel cannot be turned sufficiently far for the car to be driven away without the projecting part coming into contact with the driver of the car or a part of the vehicle.

My invention is concerned with the latter category of device, and has for its object to provide an improved, easily fitted, reasonably compact anti-theft device for fitting to a steering wheel of a road vehicle.

It is highly desirable that fitments of this type should grip the steering wheel firmly, because any possibility of movement of the device round the wheel gives the opportunity for the device to be moved into a position where the wheel is more manouverable and if necessary the device can be shifted around from position to position on the wheel as the need arises to negotiate sharp corners. The device should also be reasonably easy to fit and to remove and should not be too cumbersome.

A further desideratum, achieved at least in the preferred forms of my invention, is that the device shall be capable of being fitted onto a fairly wide range of sizes of wheel.

According to my invention I provide a road vehicle anti-theft device having a body which provides a channel to receive a sector of a vehicle steering wheel by a radial movement of the device relatively to the wheel, retaining means movable towards and away from the said channel to hold the wheel in position in the channel, so that the wheel is gripped by the device, locking means to hold the retaining means in position but which is releasable to free the retaining means so that the device cam be removed from the steering wheel and a projecting element which prevents the wheel being turned sufficiently to allow the vehicle to be driven.

According to my preferred arrangement the channel is adapted so that the device fits over the wheel from beyond the periphery of the wheel, i.e., the movement of the device when the wheel is entering the channel is radially inwards towards the steering wheel hub.

For convenience in locking the device in position the retaining means may be movable into its locking position against spring pressure. According to the preferred form of the invention the retaining means can be pushed into position against the spring pressure by hand force, whether or not the lock is in its locked position; if the lock is in its locked position, it automatically locks the retaining means against outward movement to free the device until the lock is released. On release of the lock the retaining means then springs outwardly under the pressure of the springs.

As regards the shape of the retaining means, this is preferably hook shaped and may comprise two hook shaped members. In either case the free end of the hook (or of each such hook) may be adapted to retract into the body of the device where it will lie close to the wheel making it very difficult to force the retaining means open by any bar or lever.

An embodiment of the invention (including a minor modification) will now be described by way of example only by reference to the accompanying drawings in which:

FIG. 1 is a perspective view of the device on a steering wheel;

FIG. 2 is a section on the line II—II of FIG. 1;

FIG. 4 is a view of the capping piece from the other side to that seen in FIG. 3;

FIG. 5 is a section on the line V—V of FIG. 3; and

FIG. 6 is a detail of a modification.

Figure 3:
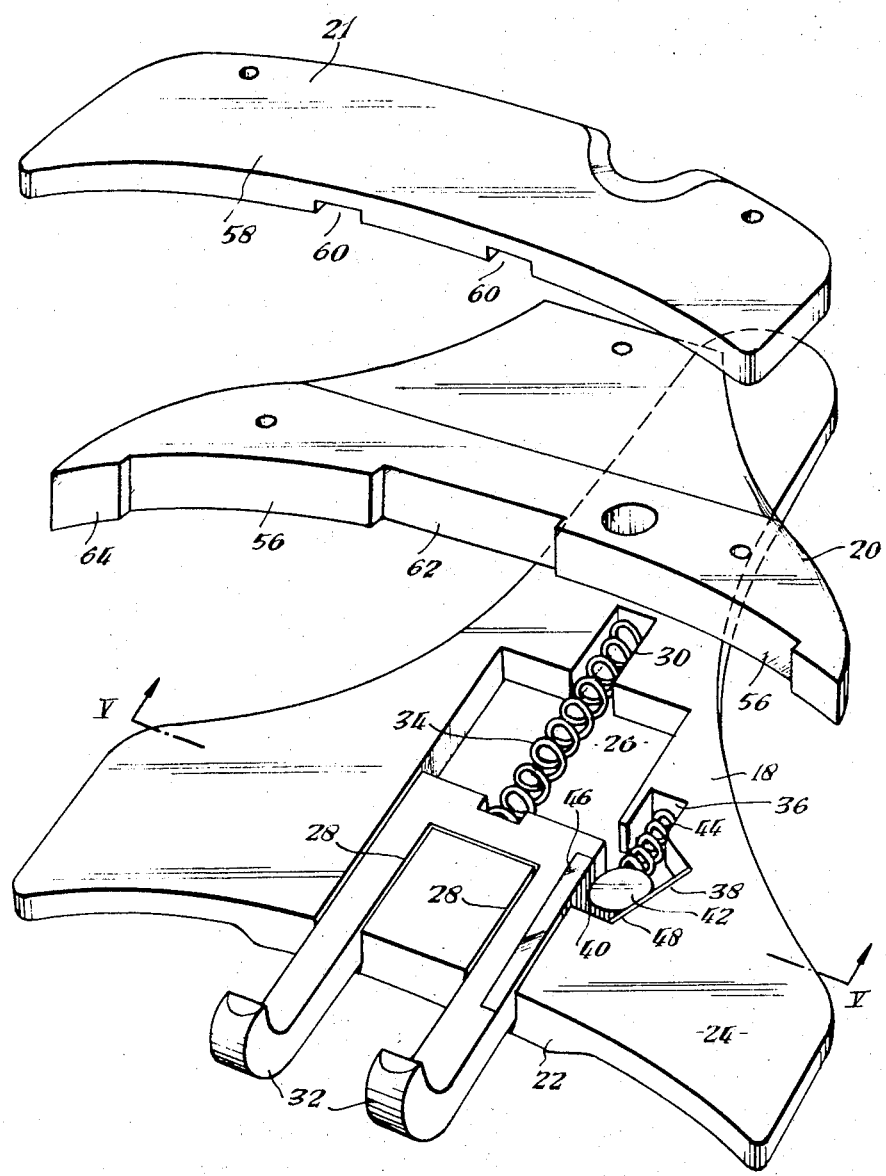
FIG. 3 is an exploded view of the device.

As seen in FIGS. 1 and 2 the device includes a projecting element 8 and provides a channel 10 which can receive a sector of a steering wheel shown broken away in FIG. 1. Also illustrated in FIG. 1 is part of a retaining means 12 (shown in retaining position) and part of a locking means 14; these parts are better seen in FIGS. 2 and 3. When the device is applied to a steering wheel, it is held gripped on the wheel without undue play by means of two rubber wedges 16 (see FIG. 4) fitted into the element forming one side of the channel.

The body of the device, which may suitably be of plastics material, is made up of three parts, a lower body part 18, an upper body part 20 (using the words "lower" and "upper" in relation to the position in which the device is shown in FIGS. 1 and 2), and a flange capping piece 21 on the upper body part 20. The body part 18 has an arcuate front surface 22 and a planar top surface 24, the part of which nearest the front surface 22 forms one side of the channel 10. At the opposite end from the front surface 22 is the projecting element 8 which lies in a general direction at right angles to a chord across the front surface 22. In the planar surface 24 are located a square recess 26 with two front channels 28 leading outwardly from the recess through the front surface 22 and a single blind rear channel 30. The retaining means 12, which is generally U-shaped is positioned within the recess 26 and channels 28, two of the legs of the retaining means protruding forwardly and ending in upwardly directed hooks 32. The retaining means 12 is biassed forwardly by a compression spring 34 between the rear of the retaining means and the end of the blind channel 30.

Adjacent to, and leading into, the recess 26 is a further recess 36 having a side wall 38 lying at an angle to the side walls of the recess 26 so that, when the retaining means 12 is in place, the side of the retaining means adjacent the recess 36 and the side wall 38 of the recess converge towards a front wall 40. Lying in the recess is a disc 42, circular in plan view, with a knurled periphery, this disc being biassed forwardly by a spring 44 to contact the side of the retaining means and the side wall 38 to leave a small gap between the disc and the front wall 40. As shown in the drawings, the side of the retaining means and the side wall 38 of the recess may each be provided with a knurled steel plate 46,48 respectively, though neither of the plates 46,48 nor the knurling of the periphery of the disc 42 are essential.

The retaining means 12 can be pushed inwardly against the bias of the spring 34, and the disc 42 offers no resistance to this movement as it too can move back against the bias of its spring 44. However, movement of the retaining means in an outward (i.e., a forward) direction is prevented by the disc 42 jamming between the retaining means and the side wall 38. To release the disc 42 from this position a wedge piece 50 can be introduced between the disc and the front wall 40 of the recess 36 to spring the disc away from either the retaining means or the side wall 38. The wedge piece 50 is attached to the cylindrical push button 52 of a cabinet lock which slides in an outer casing 54 of the lock. These locks are well known in themselves and include a projecting ball on the push button which is spring biassed outwardly, so that when the ball emerges into a hole in the outer casing of the lock, the push button cannot be moved until the ball is withdrawn into the cylinder of the push button by inserting a key into the lock and turning the key. In this case the hole in the lock casing is so located that the push button is retained in its outermost position until the ball is released by turning the key of the lock, whereupon the push button can be depressed under spring bias to drive the wedge downwardly and release the disc 42, as indicated above, thereby freeing the retaining means to spring back to the position shown in FIG. 3 under the influence of the spring 34.

Other types of lock may be employed. In one such type, well-known in itself, having a central plunger and an outer casing, a pin projects radially from the central plunger to engage a generally helical slot in the outer casing; the plunger may be axially moved and rotated by use of an appropriate key and the end of the plunger, which is suitably shaped for the purpose moves axially inwardly against spring pressure and by rotation forces the disc 42 away from the retaining means on the side wall 38. This frees the retaining means to spring back to the position shown in FIG. 3, whereupon a return movement of the key can be made to withdraw the plunger. The plunger may be semicircular in transverse section with an essentially diametrical planar flat, or may have a flat-base spiral path, diverging upwardly from the axis of the plunger, into which the disc 42 is received and displaced as the plunger moves axially inwardly.

The upper body part 20 of the device, the lower part 18 and the capping piece 21 are shown as fixed together by rivets 56 though other means, for example, adhesive, may be employed. The part 20, as shown in FIGS. 3 and 4 provides a front face 56, which forms the bottom of the channel 10. The capping piece 21 provides a projecting flange, of which the under part 58 forms a side of the channel and in which, as previously noted, are located the wedges 16. Also in the part 58 are two notches 60 which receive the ends of the hooks 32 when the retaining means is in the retaining position shown in FIGS. 1 and 2. The front face 56 of the body part 20 is not of simply cylindrical form but has a central notch 62 and outer shoulders 64; this gives greater accommodation for different sizes of steering wheel within the recess 10.

To use the device, the retaining means 12 is put in its outermost position (as seen in FIG. 3), if it is not already in that position, and the device is put over a sector of the steering wheel so that this is accommodated in the channel 10 and wedged there by the rubber wedges 16. If the wheel has a spoke in a suitable position, this may be located between the legs of the retaining means 12. The legs of the retaining means are then pushed inwardly until the ends of the hooks 32 are in the notches 60. It is then in the retaining position shown in FIG. 1. In this position the device is firmly locked to the wheel, and can only be unlocked by using the correct key in the cabinet lock; the projecting member 8 which lies in a general radial direction away from the steering wheel prevents the steering wheel being rotated sufficiently to drive the vehicle as it would abut the driver's seat or a door or the windscreen or some other part of the interior of the vehicle. Moreover, as will be evident from the figures, especially FIG. 1, in addition to preventing removal of the device from the steering wheel in a radial direction, the channel, in cooperation with the hook-shaped retaining means 12 prevents movement of the device away from its operative position on the steering wheel such as by twisting the device in the plane of the steering wheel or about an axis in that plane. To release the device a key is inserted into the cabinet lock and turned, and the push button 52 is depressed, thus releasing the disc 42 from holding the retaining means 12 in its retaining position, whereupon the retaning means moves outwardly under the influence of its spring 34 to the position shown in FIG. 3. Then the device can be removed from the steering wheel.

In this modification shown in FIG. 6 (in which the same reference numerals are used as in FIGS. 1 to 5 to designate equivalent parts) the capping piece 21 is combined with the upper body part 20 in one integral piece which is fixed by adhesive to the lower body part 18; the bottom of the channel 10 is curved in cross section, the wedging rubbers 16 being fitted across the upper part of the channel substantially as described with reference to FIGS. 1 to 5.

What is claimed is:

1. A road vehicle anti-theft device comprising:
   a body having a channel formed along and open into one edge of the body,
   said channel being shaped to receive a portion of a vehicle steering wheel, the channel including means for engaging the outer periphery of the steering wheel at at least two points along the length of the channel, the body being movable in a radial direction relative to a vehicle steering wheel onto said vehicle steering wheel, receiving said portion of the steering wheel in the channel,
   retaining means slidably mounted in the body and including hook-shaped means movable from an extended position spaced from the open side of the channel toward the open side of the channel to essentially close the said open side of the channel at at least two points along the length of the channel so as to retain the steering wheel in the channel,
   said retaining means, in cooperation with said channel, forming a means for preventing (a) radial movement of the body off of the steering wheel, (b) substantial turning movement of the body about an axis in the plane of the steering wheel and (c) substantial turning movement of the body in the plane of the steering wheel,
   locking means for locking the retaining means in the retaining position, and an element connected to the body and projecting approximately radially relative to the steering wheel to prevent the wheel from being turned sufficiently to allow the vehicle to be driven.

2. A device according to claim 1, wherein the hook means has two hooks with free ends which retract into the body of the device.

3. A device according to claim 1 wherein the channel is opened radially inwardly relative to the steering wheel and is hence adapted to be introduced over the wheel from beyond the periphery of the wheel by a radially inward movement.

4. A device according to claim 1 wherein the retaining means is movable towards said channel against spring pressure, so that it springs outwardly when released by the locking means.

5. A device according to claim 4 wherein the retaining means is freely movable into retaining position under hand force even when the locking means is in locked position, but is automatically locked against movement in the opposite direction until the lock is released.

6. A road vehicle anti-theft device having a body with a channel open along one side thereof to receive a sector of a vehicle steering wheel, hook-shaped retaining means movable against spring pressure towards the open side of the channel to retain the wheel sector therein, two hooks on said retaining means, each having a free end which retracts into the body of the device, locking means to lock the retaining means in the retaining position, springs means to urge the retaining means away from the channel when the locking means is released, and an element connected to the body and projecting approximately radially from the steering wheel so as to prevent the wheel from being turned sufficiently to allow the vehicle to be driven.

* * * * *